(12) United States Patent
Satoh et al.

(10) Patent No.: US 8,154,619 B2
(45) Date of Patent: Apr. 10, 2012

(54) IMAGING APPARATUS, IMAGING PROCESSING METHOD, AND IMAGING CONTROL PROGRAM

(75) Inventors: Yutaka Satoh, Tokyo (JP); Akira Asoma, Kanagawa (JP)

(73) Assignee: Sony Corporation, Tokyo (JP)

(*) Notice: Subject to any disclaimer, the term of this patent is extended or adjusted under 35 U.S.C. 154(b) by 303 days.

(21) Appl. No.: 12/272,108

(22) Filed: Nov. 17, 2008

(65) Prior Publication Data

US 2009/0153699 A1 Jun. 18, 2009

(30) Foreign Application Priority Data

Dec. 18, 2007 (JP) ................................. 2007-326250

(51) Int. Cl.
*H04N 5/235* (2006.01)
(52) U.S. Cl. ............... 348/229.1; 348/230.1; 348/222.1; 348/223.1
(58) Field of Classification Search .... 348/221.1–230.1, 348/362–368
See application file for complete search history.

(56) References Cited

U.S. PATENT DOCUMENTS

| | | |
|---|---|---|
| 5,455,621 A | 10/1995 | Morimura |
| 2006/0033823 A1 | 2/2006 | Okamura |

FOREIGN PATENT DOCUMENTS

| | | |
|---|---|---|
| JP | 6-141229 | 5/1994 |
| JP | 9-200621 | 7/1997 |
| JP | 11-266402 | 9/1999 |
| JP | 2001-69408 | 3/2001 |
| JP | 2002-84449 | 3/2002 |
| JP | 2002-135787 | 5/2002 |
| JP | 2003-169259 | 6/2003 |
| JP | 2003-244719 | 8/2003 |
| JP | 2004-64165 | 2/2004 |
| JP | 2004-120205 | 4/2004 |
| JP | 2006-14117 | 1/2006 |
| JP | 2007-36714 | 2/2007 |

OTHER PUBLICATIONS

U.S. Appl. No. 12/509,741, filed Jul. 27, 2009, Asoma.

*Primary Examiner* — David Ometz
*Assistant Examiner* — Dwight C Tejano
(74) *Attorney, Agent, or Firm* — Oblon, Spivak, McClelland, Maier & Neustadt, L.L.P.

(57) ABSTRACT

An imaging apparatus includes: an imaging device outputting, during a unit period of time, a long-exposure-time image signal having a relatively long exposure time and a short-exposure-time image signal having a relatively short exposure time; a first clipping processing mechanism clipping a part not lower than a first signal level of a luminance signal obtained from the long-exposure-time image signal; a second clipping processing mechanism clipping a part not higher than a second signal level of a luminance signal obtained from the short-exposure-time image signal; and a signal processing mechanism generating a synthesized image signal having a dynamic range wider than dynamic ranges of both of the image signals by synthesizing the clipped image signals, wherein the second signal level is not lower than a signal level obtained by dividing the first signal level by a ratio in time of the long exposure time to the short exposure time.

5 Claims, 9 Drawing Sheets

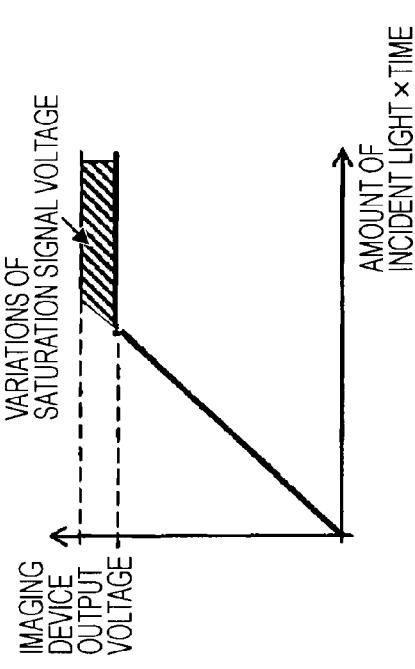
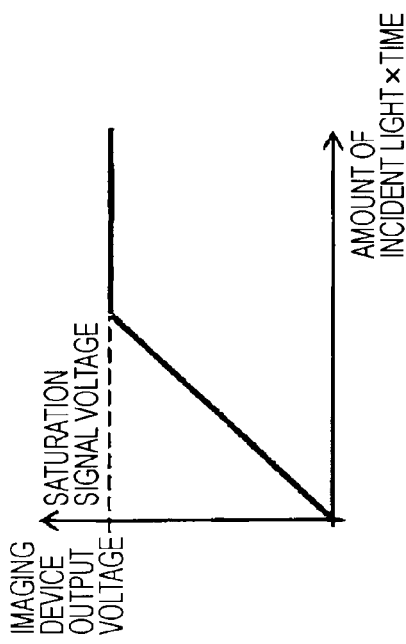
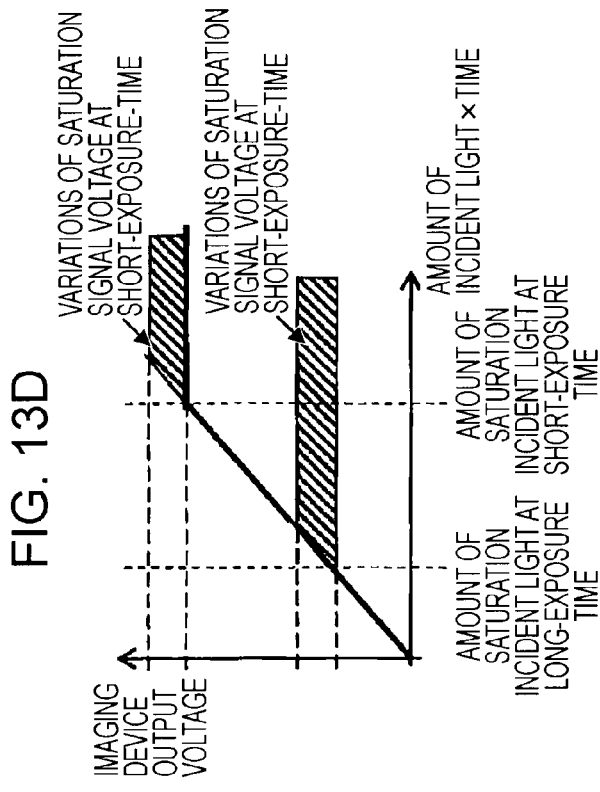

IMAGING APPARATUS, IMAGING PROCESSING METHOD, AND IMAGING CONTROL PROGRAM

CROSS REFERENCES TO RELATED APPLICATIONS

The present invention contains subject matter related to Japanese Patent Application JP 2007-326250 filed in the Japanese Patent Office on Dec. 18, 2007, the entire contents of which are incorporated herein by reference.

BACKGROUND OF THE INVENTION

1. Field of the Invention

The present invention relates to an imaging apparatus, an imaging method, and an imaging control program which generate a synthesized image signal having a wide dynamic range by synthesizing a long-exposure-time signal and a short-exposure-time signal.

2. Description of the Related Art

In a related-art imaging apparatus using a solid-state imaging device such as a CCD (Charge Coupled Device), etc., the amount of light input (amount of exposure) into an imaging device is adjusted by an aperture and en electronic shutter speed. That is to say, the amount of exposure is decreased when a light scene is shot in order to prevent the occurrence of so-called overexposure, which is caused by the saturation of the output signal. On the contrary, the amount of exposure is increased when a dark scene is shot in order to prevent the occurrence of so-called underexposure.

However, when shooting a scene having a great difference in lighting (shooting in backlight, shooting indoors and outdoors simultaneously), there is a problem in that it is difficult to properly reproduce both a light part and a dark part. This is because overexposure occurs at the light part because of saturation, and underexposure occurs at the dark part by only adjusting the amount of exposure on account of a shortage of a dynamic range of a solid-state imaging device to be used.

In order to address this problem, for example, the following method has been disclosed in Japanese Unexamined Patent Application Publication No. 06-141229 (corresponding U.S. Pat. No. 5,455,621). In this method, two different electronic shutter speeds are used in a field, or an electronic shutter speed is changed for each field to capture information of a light area and information of a dark area separately, and the individual pieces of information obtained are synthesized to one image.

Also, as an application of the above, there is an apparatus (a wide-dynamic-range camera) capable of capturing an image having a wide dynamic range. An apparatus and method of improving the quality of the synthesized image has been disclosed, for example, in Japanese Unexamined Patent Application Publication No. 2002-84449 and 2004-120205 (corresponding US publication 2006-033823A1).

In general, as shown in FIG. 13A, an imaging device has a characteristic in which an output voltage is saturated at a certain level with respect to the amount of incident light. As shown in FIG. 13B, the saturation level of individual pixels has variations in an overall screen. Thus, there is a problem in that the video looks uneven on the screen.

If a dynamic range is widened by synthesizing a long-exposure-time signal and a short-exposure-time signal which have variations in the saturation level for each pixel as shown in FIG. 13C, the saturation unevenness of the synthesized signal appears not only at a high-luminance side caused by the short-exposure-time signal, but also in a middle-luminance area caused by the long-exposure-time signal as shown in FIG. 13D.

For a method of reducing the saturation unevenness, the following methods are available. One of the methods is to clip peaks of the output of an imaging device, and then to perform AD (Analog-to-Digital) conversion. Another method is to lower the upper limit value to be subjected to AD conversion than the level at which the saturation unevenness occurs. Still another method is to clip the signal not lower than a certain level of the digital signal after AD conversion.

For example, Japanese Unexamined Patent Application Publication No. 09-200621 has disclosed a solid-state imaging apparatus which is inexpensive, has little saturation unevenness, and has a wide dynamic range using one solid-state imaging device. In the imaging apparatus, a solid-state imaging device is driven at a speed n (n is an integer of 2 or more) times a usual speed, n shutter pulses are supplied in one field to finely control to obtain an image output with continuous gradations, the image output is subjected to white clipping and then stored into n pieces of field memories, the image output is synchronized with a vertical synchronization pule VD and then is added up by an adder to be output.

Also, Japanese Patent No. 3642245 (corresponding U.S. Pat. No. 6,972,800) has disclosed a solid-state imaging apparatus in which an improvement has been made of gradations on the synthesized part of two kinds of video signals as follows. The solid-state imaging apparatus, which widens a dynamic range by synthesizing two kinds of video signals having different amounts of exposure, has a function of setting the gains of a long-exposure-time signal and a short-exposure-time signal to have different values and setting a knee point of the long-exposure-time signal and a knee point of a short-exposure-time signal to have different values. The solid-state imaging apparatus widens the dynamic range by synthesizing the long-exposure-time signal and the short-exposure-time signal, sets the knee point of the long-exposure-time signal lower than a predetermined luminance level, which is a synthesis level, and sets the knee point of the short-exposure-time signal higher than a predetermined luminance level, which is the synthesis level.

SUMMARY OF THE INVENTION

However, in an imaging apparatus, which widens a dynamic range by synthesizing a long-exposure-time signal and a short-exposure-time signal, there has been a problem in that it is difficult to completely eliminate a phenomenon of saturation unevenness arising in the middle-luminance part by only using peak-clipping processing. In an imaging device of a type of conducting exposure twice in one vertical synchronization period, it is necessary for a short-exposure time to be included within a vertical blanking period. Thus, if it is assumed that a long-exposure time is used as the longest, the ratio of a long-exposure time to a short-exposure time becomes about 20 times or more. Accordingly, the amount of the output signal of the imaging device obtained from a same amount of light becomes different by the ratio of exposure, and thus the short-exposure-time signal has an S/N ratio lower as much as the ratio of exposure.

Also, if processing is performed by placing emphasis on a characteristic of smoothing the gradations on the higher level of the long-exposure-time signal and the lower level of the short-exposure-time signal, there has been a problem in that the lowness of the SN at a low luminance part of the short-exposure-time signal becomes conspicuous, and the saturation unevenness appears in a middle luminance part, because a dark part of the short-exposure-time signal becomes the output level of the middle luminance part.

Accordingly, in view of the above-described circumstances to date, it is desirable for an imaging apparatus, which widens a dynamic range by synthesizing a long-exposure-time signal and a short-exposure-time signal, to obtain a synthesized image signal which has a wide dynamic range such that the saturation unevenness of the high-luminance part of the long-exposure-time signal and noise of the luminance signal and the color signal of the low-luminance part of the short-exposure-time signal are inconspicuous.

Furthermore, specific advantages obtained by the present invention will become more obvious by the following description of embodiments of the present invention.

In the present invention, an imaging device obtains a long-exposure-time image signal having a long-exposure-time period being a relatively long exposure time and a short-exposure-time image signal having a short-exposure-time period being a relatively short exposure time, and clipping is carried out on a part not lower than a first signal level of a luminance signal obtained from the long-exposure-time image signal, and on a part not higher than a second signal level of a luminance signal obtained from the short-exposure-time image signal. Next, a synthesized image signal having a relatively wider dynamic range than both of dynamic ranges of the long-exposure-time image signal and the short-exposure-time image signal is generated by synthesizing the long-exposure-time image signal and the short-exposure-time image signal, which have been individually subjected to the clipping processing.

That is to say, according to an embodiment of the present invention, there is provided an imaging apparatus including: an imaging device outputting, during a unit period of time, a long-exposure-time image signal having a long-exposure-time period being a relatively long exposure time and a short-exposure-time image signal having a short-exposure-time period being a relatively short exposure time; first clipping processing means for clipping a part not lower than a first signal level of a luminance signal obtained from the long-exposure-time image signal; second clipping processing means for clipping a part not higher than a second signal level of a luminance signal obtained from the short-exposure-time image signal; and signal processing means for generating a synthesized image signal having a dynamic range wider than both of dynamic ranges of the long-exposure-time image signal and the short-exposure-time image signal by synthesizing the long-exposure-time image signal having been subjected to the clipping processing by the first clipping processing means and the short-exposure-time image signal having been subjected to the clipping processing by the second clipping processing means, wherein the second signal level is not lower than a signal level obtained by dividing the first signal level by a ratio in time of the long exposure time to the short exposure time.

Also, according to another embodiment of the present invention, there is provided a method of controlling imaging, including the steps of: controlling an imaging device so that the imaging device outputs, during a unit period of time, a long-exposure-time image signal having a long-exposure-time period being a relatively long exposure time and a short-exposure-time image signal having a short-exposure-time period being a relatively short exposure time; clipping a part not lower than a first signal level of a luminance signal obtained from the long-exposure-time image signal; clipping a part not higher than a second signal level of a luminance signal obtained from the short-exposure-time image signal; and synthesizing the clipped long-exposure-time image signal and the clipped short-exposure-time image signal so that a synthesized image signal having a dynamic range wider than both of dynamic ranges of the long-exposure-time image signal and the short-exposure-time image signal is generated, wherein the second signal level is not lower than a signal level obtained by dividing the first signal level by a ratio in time of the long exposure time to the short exposure time.

Furthermore, according to another embodiment of the present invention, there is provided an imaging control program for causing a computer to perform a method of controlling imaging, the imaging control program including the steps of: controlling an imaging device so that the imaging device outputs, during a unit period of time, a long-exposure-time image signal having a long-exposure-time period being a relatively long exposure time and a short-exposure-time image signal having a short-exposure-time period being a relatively short exposure time; clipping a part not lower than a first signal level of a luminance signal obtained from the long-exposure-time image signal; clipping a part not higher than a second signal level of a luminance signal obtained from the short-exposure-time image signal; and synthesizing the clipped long-exposure-time image signal and the clipped short-exposure-time image signal so that a synthesized image signal having a dynamic range wider than both of dynamic ranges of the long-exposure-time image signal and the short-exposure-time image signal is generated, wherein the second signal level is not lower than a signal level obtained by dividing the first signal level by a ratio in time of the long exposure time to the short exposure time.

By the present invention, in an imaging apparatus widening a dynamic range by synthesizing a long-exposure-time signal and a short-exposure-time signal, clipping is carried out on a part not lower than a first signal level of a luminance signal obtained from the long-exposure-time image signal, and on a part not higher than a second signal level of a luminance signal obtained from the short-exposure-time image signal. Next, a synthesized image signal having a relatively wider dynamic range than both of dynamic ranges of the long-exposure-time image signal and the short-exposure-time image signal is generated by synthesizing the long-exposure-time image signal and the short-exposure-time image signal, which have been individually subjected to the clipping processing. It is therefore possible to obtain a synthesized image signal which has a wide dynamic range such that the saturation unevenness of the high-luminance part of the long-exposure-time signal and noise of the luminance signal and the color signal of the low-luminance part of the short-exposure-time signal are inconspicuous.

That is to say, even if clipping is carried out on a low-luminance part of the short-exposure-time signal, the long-exposure-time signal has a valid image corresponding to the clipped part. Thus, it is possible to reduce a part of the image to be lost in the image signal having a wider dynamic range. The shooting condition for demanding a wider dynamic range is not to increase the dynamic range of the imaging device itself to several times the original dynamic range, but to shoot at the time when the ratio of the amount of light between a subject effective under the long-exposure time and a subject effective under the short-exposure time is ten times or more. Thus, the effect of widening the dynamic range hardly deteriorates.

BRIEF DESCRIPTION OF THE DRAWINGS

FIGS. 13A, 13B, 13C, and 13D are diagrams schematically illustrating states of occurrence of saturation unevenness caused by widening a dynamic range by synthesizing a long-exposure-time signal and a short-exposure-time signal having variations in saturation level for each pixel.

DESCRIPTION OF THE PREFERRED EMBODIMENTS

In the following, a detailed description will be given of embodiments of the present invention with reference to the drawings. In this regard, the present invention is not limited to the following examples. It goes without saying that any modifications are possible to the present invention without departing from the spirit and scope of the invention.

Figure 1:
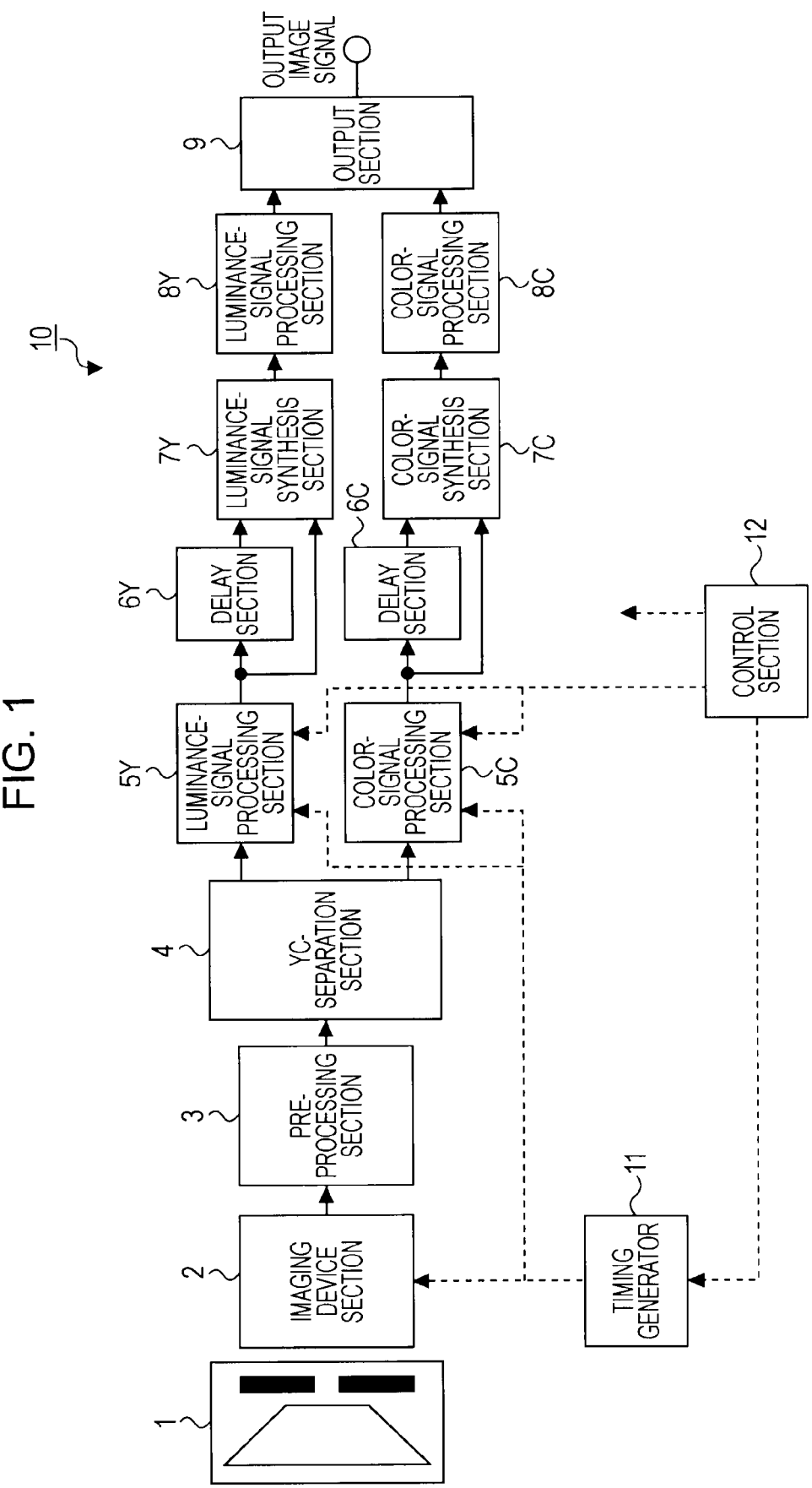
FIG. 1 is a block diagram illustrating a configuration of an imaging apparatus having a configuration to which the present invention is applied.

The present invention is applied to an imaging apparatus 10 having a configuration as shown in FIG. 1, for example.

The imaging apparatus 10 includes an imaging optical system 1, an imaging device section 2, a pre-processing section 3, a YC-separation section 4, a first luminance-signal processing section 5Y, a first color-signal processing section 5C, delay sections 6Y, 6C, a luminance-signal synthesis section 7Y, a color-signal synthesis section 7C, a second luminance-signal processing section 8Y, a second color-signal processing section 8C, an output section 9, a timing generator 11, a control section 12, etc.

The imaging optical system 1 includes optical parts, such as a lens, an optical filter for eliminating unnecessary wavelengths, an aperture, etc. The incident light from a subject is guided to the imaging device 2 through each of the optical parts in the imaging optical system 1.

Figure 2:
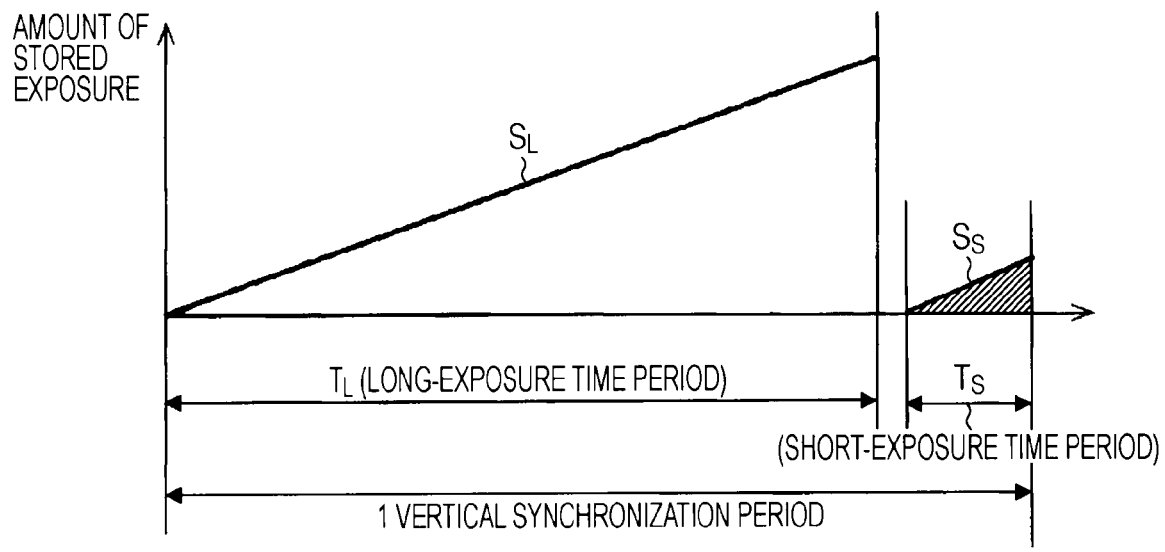
FIG. 2 is an explanatory diagram of long-exposure time and short-exposure time in the imaging apparatus.
Figure 3:
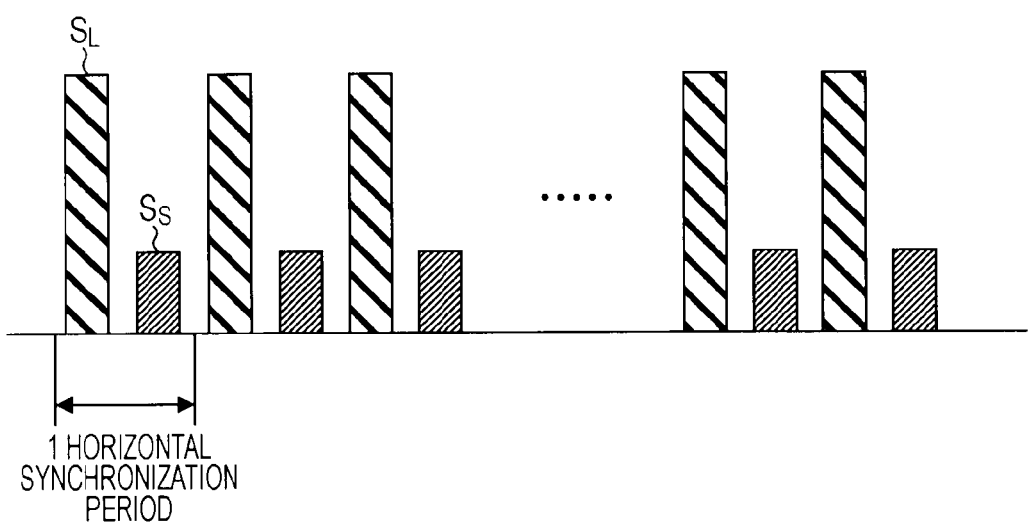
FIG. 3 is a diagram schematically illustrating a long-exposure-time signal and a short-exposure-time signal output from an imaging device section in the imaging apparatus each one horizontal-synchronization period.

The imaging device section 2 includes a solid-state imaging device, for example, such as a CCD sensor array, a CMOS sensor array, etc. The imaging device section 2 performs photoelectric conversion on the light guided through the imaging optical system 1, and outputs an electronic signal as a captured image. As shown in FIG. 2, in the imaging apparatus 10, the imaging device section 2 carries out long-time exposure and short-time exposure in one vertical synchronization period, and outputs an electronic signal as a long-exposure-time signal and a short-exposure-time by time division. The imaging device section 2 includes, for example, an interline-transfer type CCD image sensor, which is provided with the twice the normal number of stages of vertical transfer registers. In the imaging device section 2, image-pickup charge is read twice from a photoelectric conversion section to the vertical transfer registers within a vertical blanking period for each one vertical synchronization period. By transferring the image-pickup charge read into the vertical transfer registers during the two-times reading, at the immediate before the start of a vertical effective period, a long-exposure-time signal charge and a short-exposure-time signal charge are arranged in the vertical transfer registers. By driving the horizontal transfer stage at a twofold speed to read the image pickup charge, as shown in FIG. 3, one column of a long-exposure-time signal $S_L$ and a short-exposure-time signal $S_S$ is output, for example, a long-exposure-time signal charge and a short-exposure-time of the first column, a long-exposure-time signal charge and a short-exposure-time of the second column, and the long-exposure-time signal charge and a short-exposure-time of the third column are output in sequence.

In this regard, the imaging device section 2 is not limited to be configured by a solid-state imaging device. For example, the imaging device section 2 may have a configuration using, for example, a non-solid-state imaging device, such as an image pickup tube. In the case of a non-solid-state imaging device, it is also possible to carry out long-time exposure and short-time exposure, and to change an exposure time of normal exposure, long-time exposure, and short-time exposure by using a mechanical shutter, a liquid crystal shutter, etc.

Here, a description will be given of a synthesis shooting mode.

In a normal shooting operation by an imaging apparatus for a general use, it is difficult to handle a wide dynamic range from a very dark part of a subject to a very bright part. For example, when shooting is carried out indoors in a state of viewing outdoors at a time period of fine daytime, if exposure is determined on the basis of an indoor subject, an outdoor part is overexposed. Also, on the contrary, if exposure is determined on the basis of an outdoor part, an indoor subject is underexposed. That is to say, if there is a significant difference in luminance within a subject, it becomes difficult to obtain a shot image corresponding to the dynamic range of the luminance.

In contrast, in a shooting operation in a synthesis shooting mode, a shot image having a wide dynamic rage and without overexposure and underexposure is obtained by, for example, changing a shutter speed using an electronic shutter and performing synthesis processing of a plurality of images having different exposure-time periods.

Here, FIG. 2 shows a relationship between exposure time in one vertical synchronization period and the amount of stored exposure (the amount of charge) in the imaging apparatus 2.

FIG. 2 shows the case where long-time exposure of $\frac{1}{64}$ second and short-time exposure of $\frac{1}{2000}$ second are carried out during one vertical synchronization period of $\frac{1}{60}$ second. In this regard, the long-time exposure and the short-time exposure can be controlled to be varied.

By carrying out long-time exposure and short-time exposure, the long-exposure-time signal $S_L$ and the short-exposure-time signal $S_S$ are obtained in one vertical synchronization period. By synthesizing both of the image signals, imaging data of one field is generated.

In this regard, it is not necessary to perform long-time exposure and short-time exposure in one vertical synchronization period. It is thought that processing is performed such that long-time exposure is performed in a certain vertical synchronization period, then short-time exposure is performed in the next vertical synchronization period, and individual exposure image signals are synthesized.

The pre-processing section 3 of the imaging apparatus 10 is a so-called analog front end, and performs CDS (correlated double sampling) processing, gain processing by a programmable gain amplifier, and A/D conversion processing on the electronic signal as the captured image output from the imaging device 2. Next, the pre-processing section 3 supplies the exposure image signal, which has been subjected to the above-described processing, to the YC-separation section 4.

The YC-separation section 4 individually separates the long-exposure-time signal and the short-exposure-time signal, which are supplied from the pre-processing section 3, into a long-exposure-time luminance signal $Y_L$, a short-exposure-time luminance signal $Y_S$, a long-exposure-time color signal $C_L$, and a short-exposure-time color signal $C_S$. Next, the long-exposure-time luminance signal $Y_L$, and the short-exposure-time luminance signal $Y_S$, which have been separated by the YC-separation section 4 are sequentially supplied to the first luminance-signal processing section 5Y by time division. Also, the long-exposure-time color signal $C_L$ and the short-exposure-time color signal $C_S$ are sequentially supplied to the first color-signal processing section 5C by time division.

Before the long-exposure-time luminance signal $Y_L$ and the short-exposure-time luminance signal $Y_S$, which are sequentially supplied by time division from the YC-separation section 4, are synthesized, the first luminance-signal processing section 5Y performs gain processing, which matches the luminance level of the short-exposure-time luminance signal $Y_S$ with the long-exposure-time luminance signal $Y_L$, and the like. The long-exposure-time luminance signal $Y_L$ and the short-exposure-time luminance signal $Y_S$, which have been subjected to the signal processing by the first luminance-signal processing section 5Y, are directly supplied to the luminance-signal synthesis section 7Y, and at the same time, are supplied to the luminance-signal synthesis section 7Y through the delay section 6Y for synchronization.

The luminance-signal synthesis section 7Y synthesizes the synchronized long-exposure-time luminance signal $Y_L$ and the short-exposure-time luminance signal $Y_S$, which are supplied from the first luminance-signal processing section 5Y directly and through the delay section 6Y to generate a luminance signal $Y_W$ having a wide dynamic range. The luminance signal $Y_W$ synthesized by the luminance-signal synthesis section 7Y is supplied to the output section 9 through the second luminance-signal processing section 8Y.

The second luminance-signal processing section 8Y performs luminance signal processing, such as gamma correction processing, etc., on the luminance signal $Y_W$, which has been synthesized by the luminance-signal synthesis section 7Y, and has a widened dynamic range.

Before the long-exposure-time color signal $C_L$ and the short-exposure-time color signal $C_S$, which are sequentially supplied by time division from the YC-separation section 4, are synthesized, the first color-signal processing section 5C performs gain processing, which matches the signal level of the short-exposure-time color signal $C_S$ with the long-exposure-time color signal $C_L$, and the like. The long-exposure-time color signal $C_L$ and the short-exposure-time color signal $C_S$, which have been subjected to the signal processing by the first color-signal processing section 5C, are directly supplied to the color-signal synthesis section 7C, and at the same time, are supplied to the color-signal synthesis section 7C through the delay section 6C for synchronization.

The color-signal synthesis section 7C synthesizes the synchronized long-exposure-time color signal $C_L$ and the short-exposure-time color signal $C_S$, which are supplied from the first color-signal processing section 5C directly and through the delay section 6C to generate a color signal $C_W$ having a wide dynamic range. The color signal $C_W$ generated by the color-signal synthesis section 7C is supplied to the output section 9 through the second color-signal processing section 8C.

The second color-signal processing section 8C performs color signal processing, such as white balance processing, etc., on the color signal $C_W$, which has been synthesized by the color-signal synthesis section 7C, and has a widened dynamic range.

The output section 9 performs processing for displaying on a monitor display, or processing for transmitting to the external apparatuses. The output section 9 receives the luminance signal $Y_W$, which is supplied through the second luminance-signal processing section 8Y and whose dynamic range has been widened, and the color signal $C_W$, which is supplied through the second color-signal processing section 8C, and whose dynamic range has been widened, and outputs an imaging output signal, which has been encoded into a video signal conforming to an output format.

The timing generator 11 generates operation pulses necessary for the imaging device 2, such as a CCD image sensor, for example. The timing generator 11 generates various kinds of pulses, such as four-phase pulses for vertical transfer, field shift pulses, two-phase pulses for horizontal transfer, shutter pulses, etc., for example, and supplies the pulses to imaging device section 2. The timing generator 11 allows driving the imaging device 2. By receiving an instruction of synthesis shooting mode from the control section 9, the timing generator 11 causes the imaging device 2 to carry out long-time exposure having a relatively long exposure time and a short-time exposure having a relatively short exposure time as shown in FIG. 2.

Also, the timing generator 11 supplies an exposure determination signal indicating a long-exposure-time period in the synthesis shooting mode as a high level, and a short-exposure-time period as a low level to the first luminance-signal processing section 5Y, and the first color-signal processing section 5C.

The control section 12 includes, for example, a microcomputer having a CPU (Central Processing Unit), a ROM (Read Only Memory), a RAM (Random Access Memory), a flash memory, etc., and controls the operation of the overall imaging apparatus 10. The ROM in the control section 12 stores an imaging control program executing the control processing, and executes calculation and control processing necessary for the above-described individual control.

Figure 4:
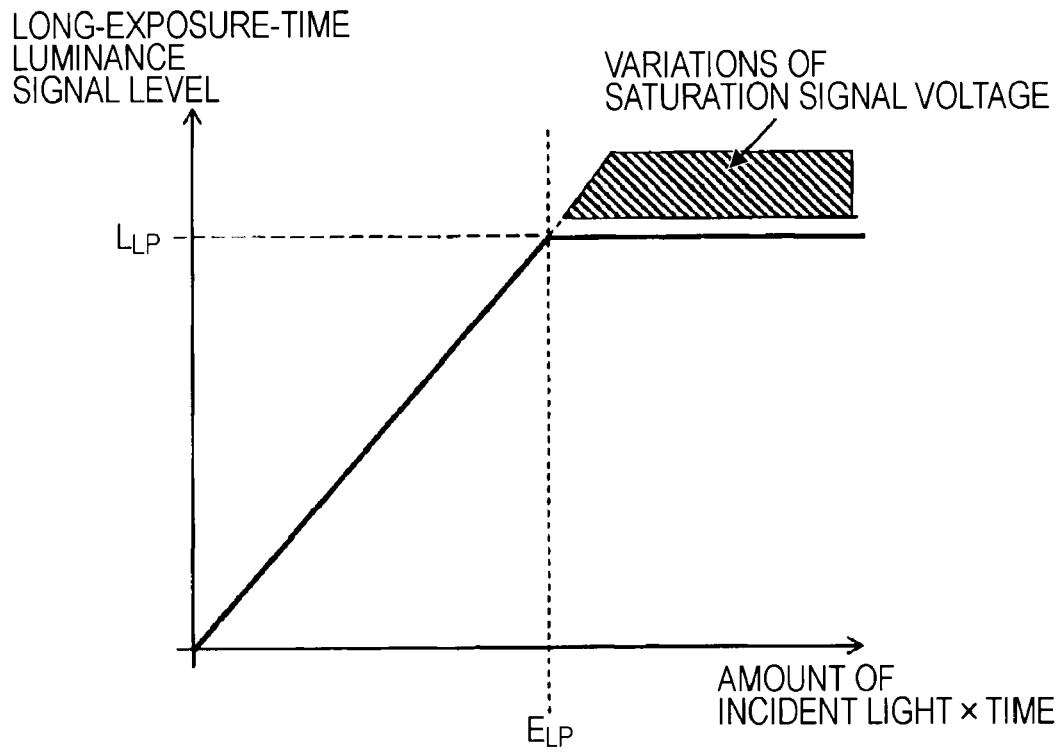
FIG. 4 is a diagram schematically illustrating a long-exposure-time signal obtained by the imaging device section.
Figure 5:
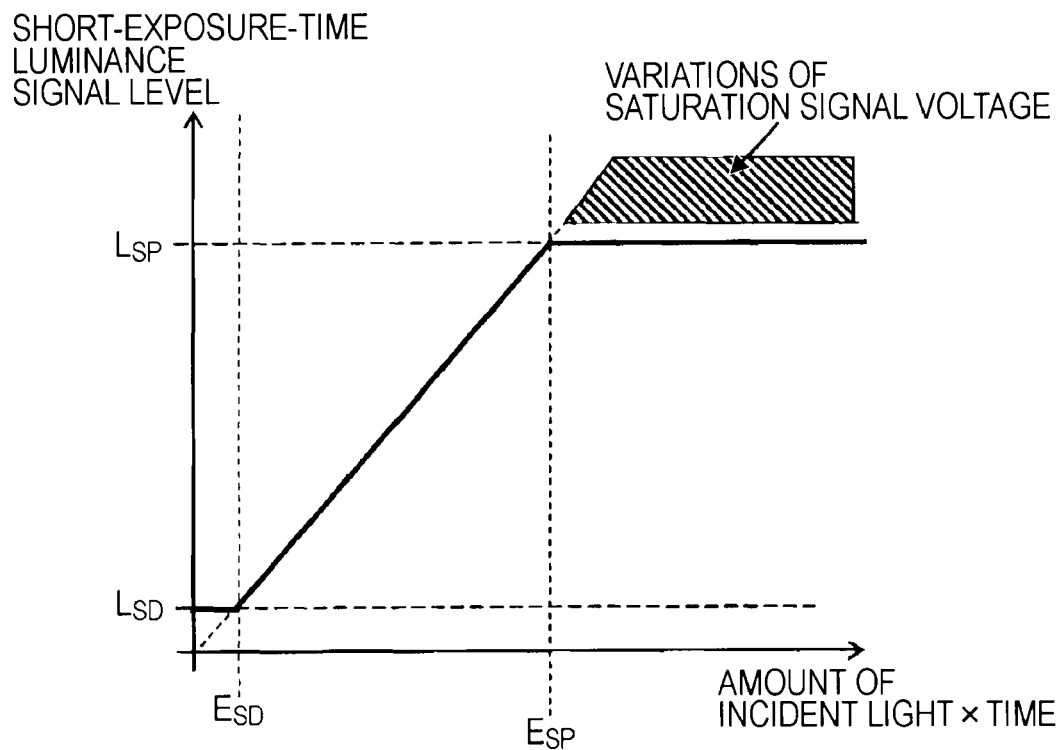
FIG. 5 is a diagram schematically illustrating a short-exposure-time signal obtained by the imaging device section.

In the imaging apparatus 10, the first luminance-signal processing section 5Y performs peak-clipping processing on the long-exposure-time luminance signal $Y_L$ to clip a signal level not lower than a signal level $L_{LP}$, which is smaller than a signal level generating variations of the saturation signal voltage thereof, thereby giving the characteristic shown in FIG. 4. Also, the first luminance-signal processing section 5Y performs peak-clipping processing on the short-exposuretime luminance signal $Y_S$ to clip a signal level not lower than a signal level $L_{SP}$, which is smaller than a signal level generating variations of the saturation signal voltage thereof, and performs dark-clipping processing to clip a signal not higher than a certain value $L_{SD}$, thereby giving the characteristic shown in FIG. 5.

The clipping level value $L_{SD}$ of the dark-clipping processing performed on the short-exposure-time luminance signal $Y_S$ is set as follow:

$$L_{SD} \geq L_{LP} \div (T_L/T_S)$$

where the long-exposure time is $T_L$, and the short-exposure time is $T_S$.

That is to say, the clipping level value $L_{SD}$ of the dark-clipping processing performed on the short-exposure-time luminance signal $Y_S$ is determined to be not lower than the signal level obtained by dividing the clipping level value $L_{LP}$ of the peak clipping performed on the long-exposure-time luminance signal $Y_L$ by the time ratio ($T_L/T_S$) of the long-exposure time is $T_L$ for obtaining a long-exposure-time signal by the imaging device section 2 to the short-exposure time is $T_S$ for obtaining the short-exposure-time signal.

Figure 6:
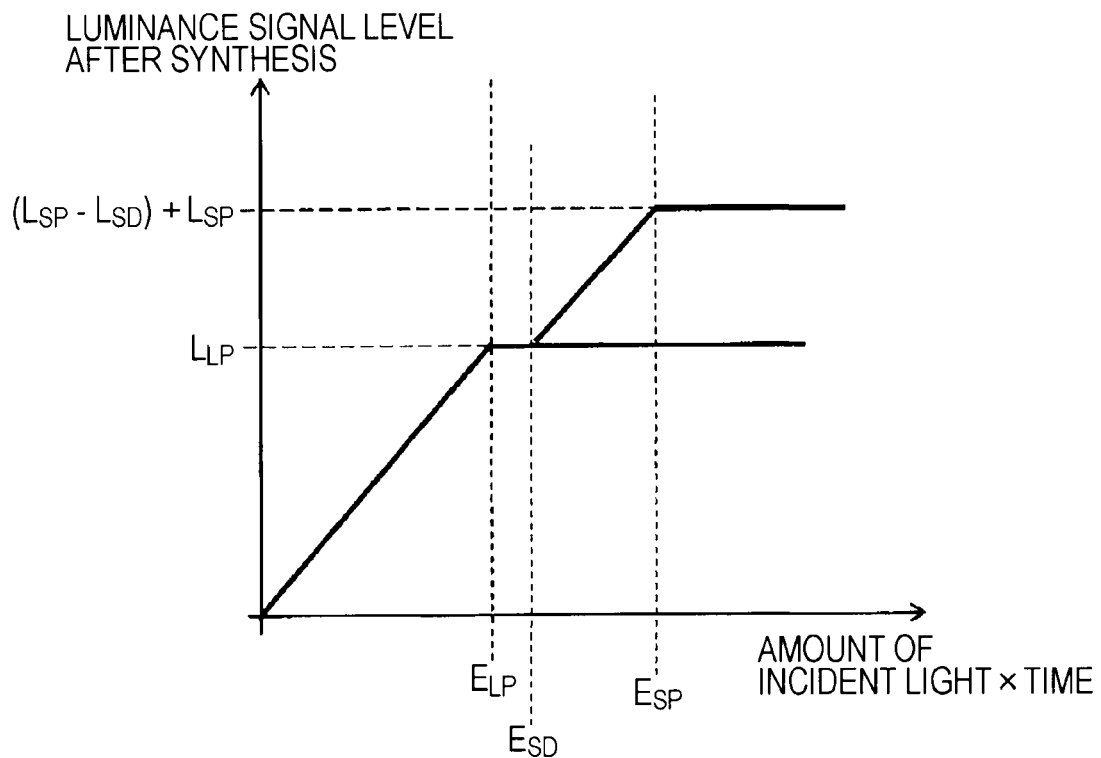
FIG. 6 is an explanatory diagram of a synthesis processing of the long-exposure-time signal and the short-exposure-time signal in the imaging apparatus.

Next, as shown in FIG. 6, the luminance-signal synthesis section 7Y assumes that $L_{LP}=L_{SD}$, and synthesizes the long-exposure-time luminance signal $Y_L$ and the short-exposure-time luminance signal $Y_S$ to generate the luminance signal $Y_W$ having a wide dynamic range.

That is to say, in the imaging apparatus 10, the imaging device 2 obtains, during a unit period of time, a long-exposure-time image signal having a long-exposure-time period being a relatively long exposure time and a short-exposure-time image signal having a short-exposure-time period being a relatively short exposure time. The first luminance-signal processing section 5Y performs peak-clipping processing which clips a part not lower than a first signal level of the luminance signal $Y_L$ obtained from the long-exposure-time image signal, and performs dark clipping processing which clips a part not higher than a second signal level of a luminance signal obtained from the short-exposure-time luminance signal $Y_S$. The clipping level value $L_{SD}$ of the dark-clipping processing performed on the short-exposure-time luminance signal $Y_S$ is determined to be not lower than the signal level obtained by dividing the clipping level value $L_{LP}$ of the peak clipping performed on the long-exposure-time luminance signal $Y_L$ by the time ratio ($T_L/T_S$) of the long-exposure time is $T_L$ for obtaining a long-exposure-time signal by the imaging device section 2 to the short-exposure time is $T_S$ for obtaining the short-exposure-time signal. The luminance-signal synthesis section 7Y assumes that $L_{LP}=L_{SD}$, and synthesizes the long-exposure-time luminance signal $Y_L$ and the short-exposure-time luminance signal $Y_S$ to generate the luminance signal $Y_W$ having a wide dynamic range.

In this manner, in the imaging apparatus 10 which widens a dynamic range by synthesizing a long-exposure-time signal and a short-exposure-time signal, clipping is carried out on a part not lower than a first signal level of the luminance signal $Y_L$ obtained from the long-exposure-time image signal, and on a part not higher than a second signal level of the luminance signal obtained from the short-exposure-time image signal $Y_S$. Next, a synthesized image signal having a relatively wider dynamic range than both of dynamic ranges of the long-exposure-time image signal and the short-exposure-time image signal is generated by synthesizing the long-exposure-time image signal and the short-exposure-time image signal, which have been individually subjected to the clipping processing. It is therefore possible to obtain a synthesized image signal which has a wide dynamic range such that the saturation unevenness of the high-luminance part of the long-exposure-time signal and noise of the luminance signal and the color signal of the low-luminance part of the short-exposure-time signal are inconspicuous.

That is to say, even if clipping is carried out on a low-luminance part of the short-exposure-time signal, the long-exposure-time signal has a valid image corresponding to the clipped part. Thus, it is possible to reduce a part of the image to be lost in the image signal having a wider dynamic range. The shooting condition for demanding a wider dynamic range is not to increase the dynamic range of the imaging device itself to several times the original dynamic range, but to shoot at the time when the ratio of the amount of light between a subject effective under the long-exposure time and a subject effective under the short-exposure time is ten times or more. Thus, the effect of widening the dynamic range hardly deteriorates.

Here, the first luminance-signal processing section 5Y, which performs the above-described clipping processing, has a first clipping function of clipping a part not lower than a first signal level of the luminance signal obtained from the long-exposure-time image signal, and a second clipping function of clipping a part not higher than a second signal level of a luminance signal obtained from the short-exposure-time luminance signal. For example, as shown in FIG. 7, it is possible to perform the above-described clipping processing by a single clipping circuit.

Figure 7:
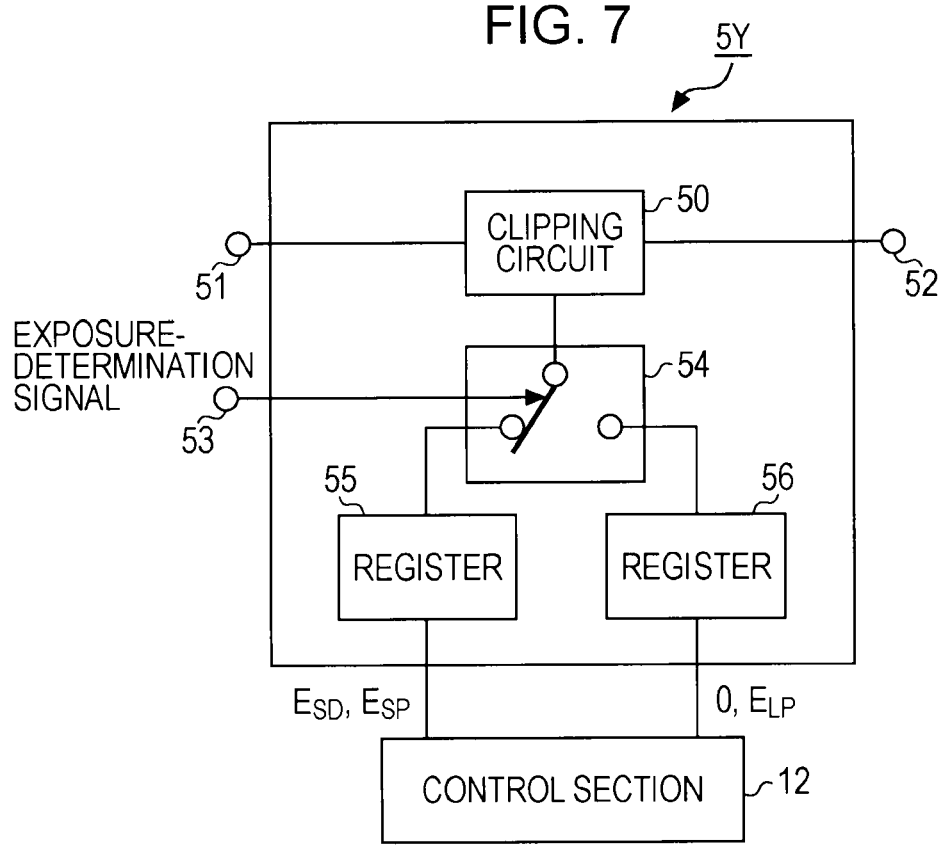
FIG. 7 is a block diagram illustrating an example of a configuration of a first luminance-signal processing section performing clipping processing in the imaging apparatus.

The first luminance-signal processing section 5Y shown in FIG. 7 includes a clipping circuit 50 which performs clipping processing on the luminance signal supplied from an input terminal 51, and outputs the luminance signal having been subjected to the clipping processing from an output terminal 52, a switching circuit 54 which is subjected to switching control by an exposure-determination signal supplied from an exposure-determination input terminal 53 from the timing generator 11, a register 55 which holds the short-exposure-time clipping level value given from the control section 12, and a register 56 which holds the long-exposure-time clipping level value given from the control section 12. The individual clipping level values held in the registers 55 and 56 are given to the clipping circuit 50 through the switching circuit 54.

Figure 8:
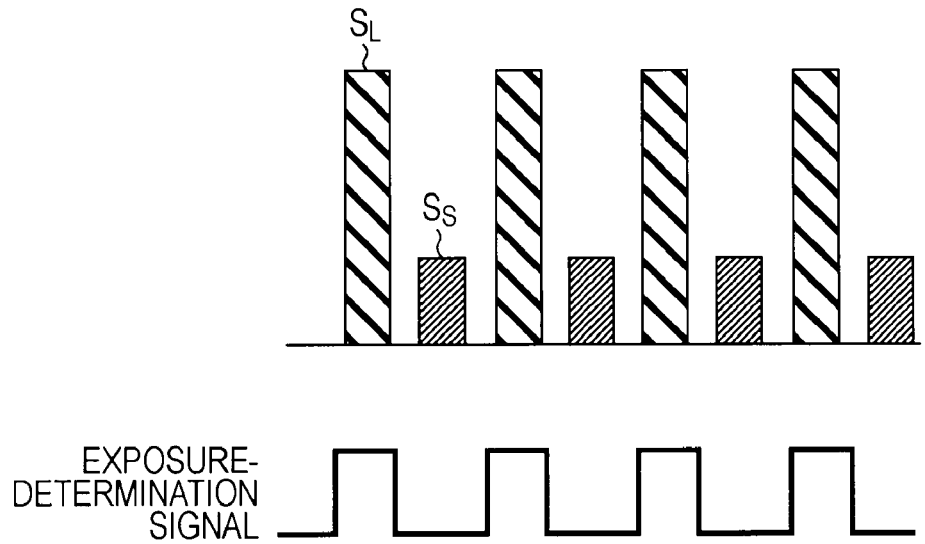
FIG. 8 is a diagram schematically illustrating an exposure determination signal given from a timing generator 11 to the first luminance-signal processing section shown in FIG. 7 in the imaging apparatus.

In the first luminance-signal processing section 5Y, the switching circuit 54 operates so as to receive the exposure-determination signal indicating a long-exposure-time period as a high level "H" and a short-exposure-time period as a low level "L" at the exposure-determination input terminal 53, which are supplied from the timing generator 11 as shown in FIG. 8. Thereby, the first luminance-signal processing section 5Y validates the value of the register 55 during the short-exposure-time period in which the exposure-determination signal is the low level "L", and validates the value of the register 56 during the short-exposure-time period in which the exposure-determination signal is the high level "H".

Figure 9:
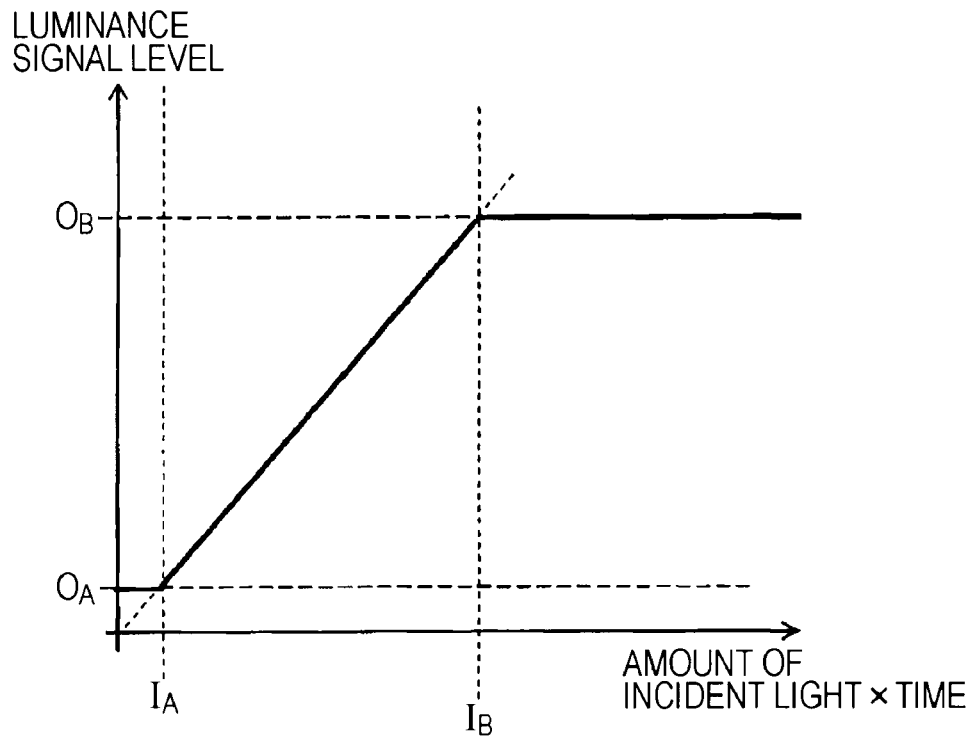
FIG. 9 is a diagram schematically illustrating an operation of the clipping circuit in the first luminance-signal processing section shown in FIG. 7.

The clipping circuit 50 performs clipping so that a part not higher than an input level $I_A$ has an output level $O_A$, and performs clipping so that a part not lower than an input level $I_B$ has an output level $O_B$ as shown in FIG. 9. By determining, as the short-exposure-time clipping level values, the setting values given by the control section 12 to the register 55 to be $I_A=E_{SD}$ and $I_B=E_{SP}$, and by determining, as the long-exposure-time clipping level values, the setting values given by the control section 12 to the register 56 to be $I_A=0$ and $I_B=E_{LP}$, it is possible to give the characteristic shown in FIG. 4 to the long-exposure-time signal $Y_L$, and the characteristic shown in FIG. 5 to the short-exposure-time signal $Y_S$.

Here, in the imaging apparatus 10, the first color-signal processing section 5C to the second color-signal processing section 8C generate the color signal $C_W$ corresponding to the luminance signal $Y_W$, having a wider dynamic range, generated by the first luminance-signal processing section 5Y to the second luminance-signal processing section 8Y in the same operation as that of the first luminance-signal processing section 5Y to the second luminance-signal processing section 8Y. However, it is possible to further make noise of the color signal of the low-luminance part inconspicuous furthermore by synthesizing the color signal by the color-signal synthesis section 7C not using the short-exposure-time signal $C_S$ in an area having not higher than the clipping level of the short-exposure-time luminance signal $Y_S$.

Figure 10:
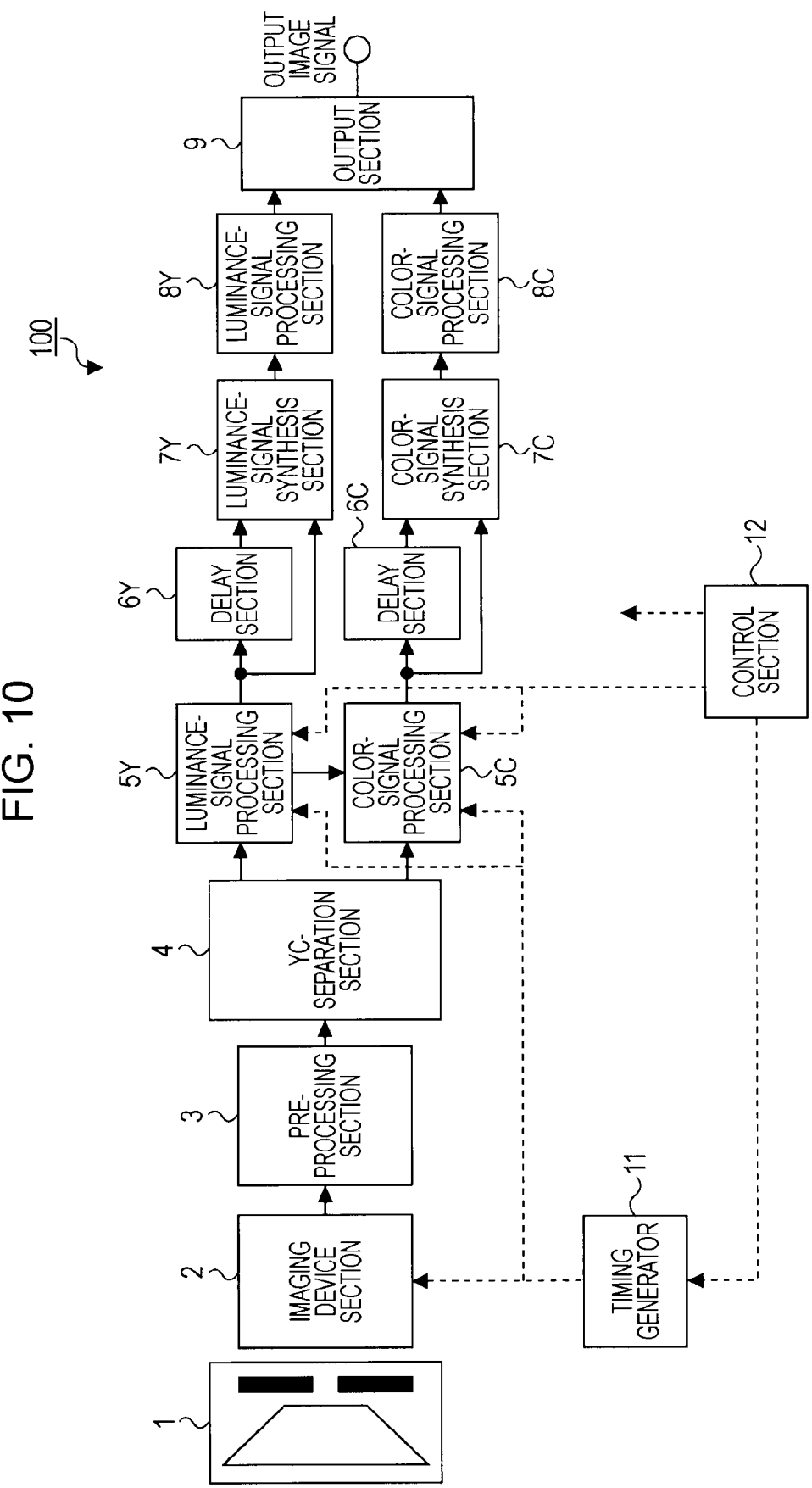
FIG. 10 is a block diagram illustrating another configuration of an imaging apparatus having a configuration to which the present invention is applied.

FIG. 10 is a block diagram illustrating a configuration of an imaging apparatus 100 in which an improvement has been made so that noise of the color signal in a low-luminance part becomes more inconspicuous in the imaging apparatus 10.

In the imaging apparatus 100 shown in FIG. 10, same components as those in the imaging apparatus 10 are marked with the corresponding reference numerals, respectively, and the detailed description thereof will be omitted.

In the imaging apparatus 100, the first luminance-signal processing section 5Y is allowed to give a control signal to the first color-signal processing section 5C.

Figure 11:
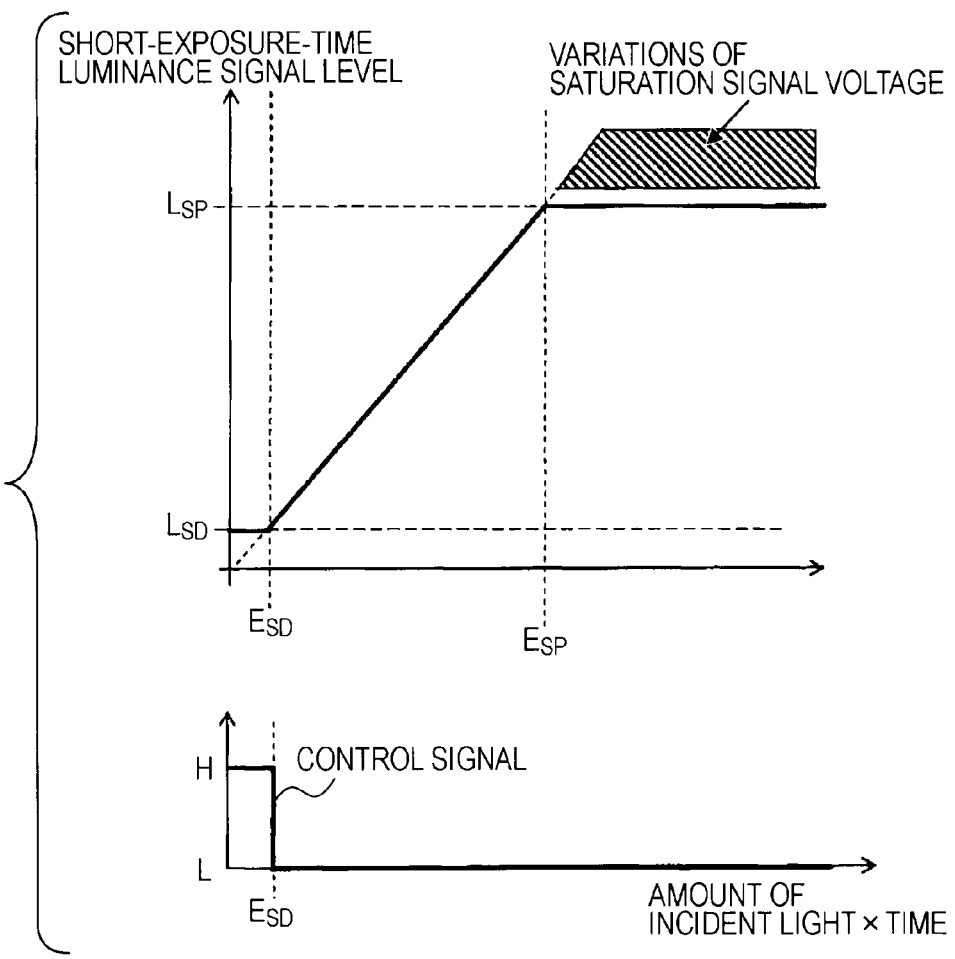
FIG. 11 is a diagram schematically illustrating a control signal given from the first luminance-signal processing section to a first color-signal processing section in the imaging apparatus.

As shown in FIG. 11, when the short-exposure-time luminance signal $Y_S$ is not higher than the dark-clipping level, the control signal is at a high level "H", and otherwise, the signal is at a low level "L".

Figure 12:
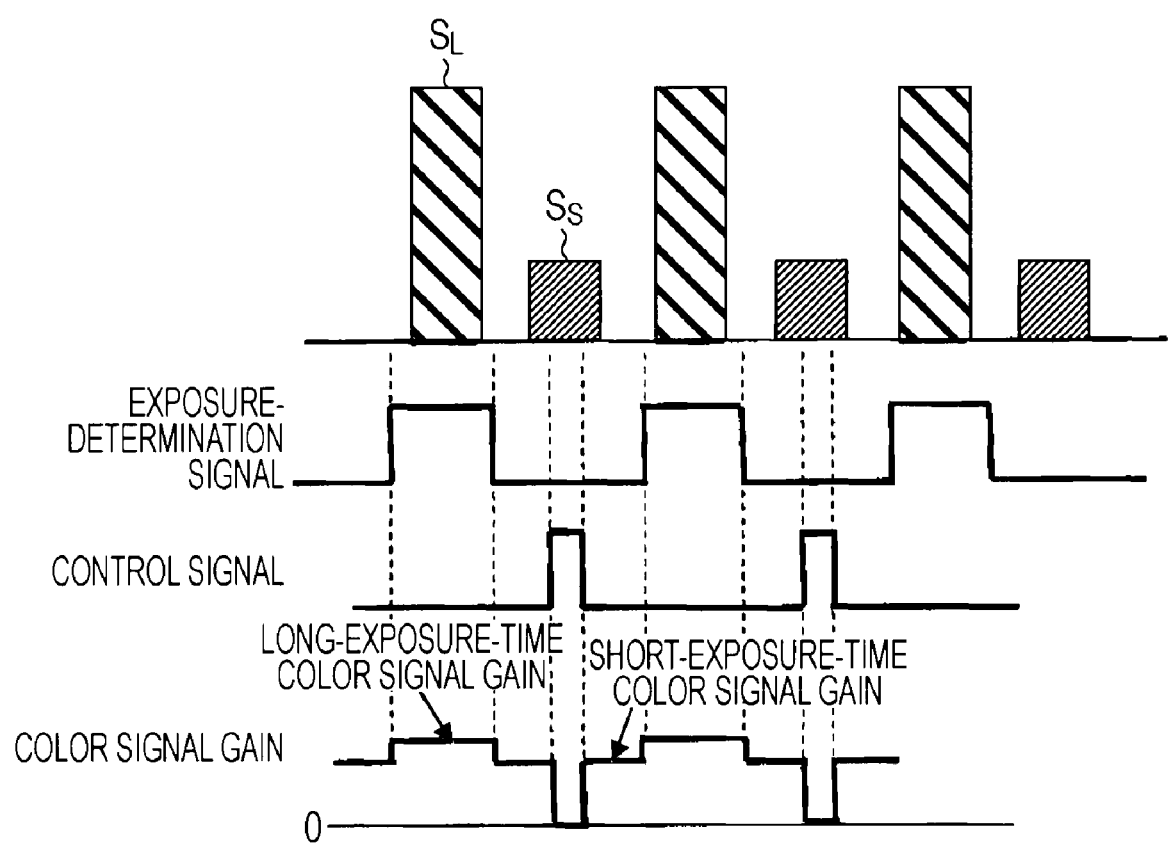
FIG. 12 is a diagram schematically illustrating gain processing in the first color-signal processing section on a long-exposure-time color signal and a short-exposure-time color signal in the imaging apparatus.

As shown in FIG. 12, the first color-signal processing section 5C sequentially receives input of the long-exposure-time color signal $C_L$ and the short-exposure-time color signal $C_S$ in a line. A color signal gain corresponding to the long-time exposure is applied to the long-exposure-time color signal $C_L$ during the long-exposure-time period while the exposure-determination signal supplied from the timing generator 11 is a high level "H". Also, A color signal gain corresponding to the short-time exposure is applied to the short-exposure-time color signal $C_S$ during the short-exposure-time period while the exposure-determination signal supplied from the timing generator 11 is a low level "L".

Furthermore, the first color-signal processing section 5C performs processing for changing the color-signal gain applied to the short-exposure-time color signal $C_S$ to 0 in the period when the control signal given from the first luminance-signal processing section 5Y is a high level "H", that is to say, in the period when the short-exposure-time luminance signal $Y_S$ is not higher than a dark clipping level.

In this manner, by changing the color-signal gain applied to the short-exposure-time color signal $C_S$ to 0 while the short-exposure-time luminance signal $Y_S$ is not higher than a dark clipping level, it is possible to obtain a synthesized image signal having a wide dynamic range and in which noise of the color signal in a low-luminance part becomes more inconspicuous.

In the imaging apparatus 10, the control section 12 executes imaging control program by a microcomputer included in the control section 12. The clipping level of the short-exposure-time luminance signal $Y_S$ in the first luminance-signal processing section 5Y is not lower than a signal level obtained by dividing the clipping level of the long-exposure-time signal $Y_L$ by a ratio $(T_L/T_S)$ in time of the long exposure time $T_L$ for obtaining the long-exposure-time signal by the imaging device section 2 to the short exposure time $T_S$ for obtaining the short-exposure-time signal. In the luminance-signal synthesis section 7Y, it is assumed that $L_{LP}=L_{SD}$, the long-exposure-time luminance signal and the short-exposure-time luminance signal having been individually subjected to clipping processing are synthesized to generate the luminance signal having a wide dynamic range in a state in which the clipping level of the long-exposure-time signal and the clipping level of the short-exposure-time signal are matched.

Furthermore, in the imaging apparatus 10, the imaging control program according to the present invention is an imaging control program executed by a microcomputer included in the control section 12. The control section 12 executes imaging control program by a microcomputer included in the control section 12. The clipping level of the short-exposure-time luminance signal $Y_S$ in the first luminance-signal processing section 5Y is not lower than a signal level obtained by dividing the clipping level of the long-exposure-time signal $Y_L$ by a ratio $(T_L/T_S)$ in time of the long exposure time $T_L$ for obtaining the long-exposure-time signal to the short exposure time $T_S$ for obtaining the short-exposure-time signal. In the luminance-signal synthesis section 7Y, it is assumed that $L_{LP}=L_{SD}$, the long-exposure-time luminance signal and the short-exposure-time luminance signal having been individually subjected to clipping processing are synthesized to generate the luminance signal having a wide dynamic range in a state in which the clipping level of the long-exposure-time signal and the clipping level of the short-exposure-time signal are matched.

Such a program can be recorded in advance in an HDD as a recording medium contained in an apparatus, such as a personal computer, an imaging apparatus, etc., a ROM, a flash memory, etc., in a microcomputer having a CPU, or the like.

Alternatively, the program can be temporarily or permanently stored (recorded) in a removable recording medium, such as a flexible disk, a CD-ROM (Compact Disc Read Only Memory), an MO (Magnet Optical) disc, a DVD (Digital Versatile Disc), a Blu-ray Disc, a magnetic disk, a semiconductor memory, a memory card, etc. Such a removable recording medium can be provided as so-called packaged software.

Also, the program of the present invention can be downloaded from a download site through a network, such as a LAN (Local Area Network), the Internet, etc., in addition to installing from a removable recording medium to a personal computer, etc.

In the above, a description has been given of the embodiments. However, various variations are possible in the present invention.

For example, the present invention can be applied to a camera system capturing moving images. Also, the present invention can be applied to a camera system capturing still images. Even in the case of capturing a still image in a setting exposure mode, the above-described exposure control (control of the short-exposure-time) should be carried out in each field period, for example, during monitoring until the shooting time. Also, in the case of capturing an image, for example, by non-interlace scanning method, the above-described field-period processing should be considered as frame-period processing. Of course, not only for the scanning method, but a unit period of an image signal can be thought of as various periods, such as a field period, a frame period, a plurality of field periods, a plurality of frame periods, etc. For example, an example of operation in which exposure control processing is performed once for each of the plurality of frame periods is considered.

What is claimed is:
1. An imaging apparatus comprising:
an imaging device outputting, during a unit period of time, a long-exposure-time image signal having a long-exposure-time period being a relatively long exposure time and a short-exposure-time image signal having a short-exposure-time period being a relatively short exposure time;

first clipping processing means for clipping a part not lower than a first signal level of a luminance signal obtained from the long-exposure-time image signal;

second clipping processing means for clipping a part not higher than a second signal level of a luminance signal obtained from the short-exposure-time image signal and for clipping a part not lower than a third signal level of the luminance signal obtained from the short-exposure-time image signal; and signal processing means for generating a synthesized image signal having a dynamic range wider than both of dynamic ranges of the long-exposure-time image signal and the short-exposure-time image signal by synthesizing the long-exposure-time image signal having been subjected to the clipping processing by the first clipping processing means and the short-exposure-time image signal having been subjected to the clipping processing by the second clipping processing means, wherein the second signal level is not lower than a signal level obtained by dividing the first signal level by a ratio in time of the long exposure time to the short exposure time.

2. The imaging apparatus according to claim 1, further comprising:

color-signal processing means for obtaining a synthesized color signal by synthesizing a color signal obtained from the long-exposure-time image signal and a color signal obtained from the short-exposure-time image signal, wherein the color-signal processing means does not use the short-exposure-time image signal having a signal level not higher than a clipping level of a short-exposure-time luminance signal by the second clipping processing means.

3. A method of controlling imaging, comprising:

controlling an imaging device so that the imaging device outputs, during a unit period of time, a long-exposure-time image signal having a long-exposure-time period being a relatively long exposure time and a short-exposure-time image signal having a short-exposure-time period being a relatively short exposure time;

clipping a part not lower than a first signal level of a luminance signal obtained from the long-exposure-time image signal;

clipping a part not higher than a second signal level of a luminance signal obtained from the short-exposure-time image signal;

clipping a part not lower than a third signal level of the luminance signal obtained from the short-exposure-time image signal; and synthesizing the clipped long-exposure-time image signal and the clipped short-exposure-time image signal so that a synthesized image signal having a dynamic range wider than both of dynamic ranges of the long-exposure-time image signal and the short-exposure-time image signal is generated, wherein the second signal level is not lower than a signal level obtained by dividing the first signal level by a ratio in time of the long exposure time to the short exposure time.

4. A non-transitory computer-readable medium storing an imaging control program, which when executed by a computer, causes the computer to perform a method of controlling imaging, the method comprising:

controlling an imaging device so that the imaging device outputs, during a unit period of time, a long-exposure-time image signal having a long-exposure-time period being a relatively long exposure time and a short-exposure-time image signal having a short-exposure-time period being a relatively short exposure time;

clipping a part not lower than a first signal level of a luminance signal obtained from the long-exposure-time image signal;

clipping a part not higher than a second signal level of a luminance signal obtained from the short-exposure-time image signal;

clipping a part not lower than a third signal level of the luminance signal obtained from the short-exposure-time image signal; and synthesizing the clipped long-exposure-time image signal and the clipped short-exposure-time image signal so that a synthesized image signal having a dynamic range wider than both of dynamic ranges of the long-exposure-time image signal and the short-exposure-time image signal is generated, wherein the second signal level is not lower than a signal level obtained by dividing the first signal level by a ratio in time of the long exposure time to the short exposure time.

5. An imaging apparatus comprising:

an imaging device outputting, during a unit period of time, a long-exposure-time image signal having a long-exposure-time period being a relatively long exposure time and a short-exposure-time image signal having a short-exposure-time period being a relatively short exposure time;

a first clipping processing mechanism clipping a part not lower than a first signal level of a luminance signal obtained from the long-exposure-time image signal;

a second clipping processing mechanism clipping a part not higher than a second signal level of a luminance signal obtained from the short-exposure-time image signal and clipping a part not lower than a third signal level of the luminance signal obtained from the short-exposure-time image signal; and a signal processing mechanism generating a synthesized image signal having a dynamic range wider than both of dynamic ranges of the long-exposure-time image signal and the short-exposure-time image signal by synthesizing the long-exposure-time image signal having been subjected to clipping processing by the first clipping processing mechanism and the short-exposure-time image signal having been subjected to clipping processing by the second clipping processing mechanism, wherein the second signal level is not lower than a signal level obtained by dividing the first signal level by a ratio in time of the long exposure time to the short exposure time.

* * * * *